(12) United States Patent
Yang

(10) Patent No.: US 10,744,623 B2
(45) Date of Patent: Aug. 18, 2020

(54) RATCHET WRENCH

(71) Applicant: Cheng-Pu Yang, Taichung (TW)

(72) Inventor: Cheng-Pu Yang, Taichung (TW)

( * ) Notice: Subject to any disclaimer, the term of this patent is extended or adjusted under 35 U.S.C. 154(b) by 365 days.

(21) Appl. No.: 15/803,834

(22) Filed: Nov. 5, 2017

(65) Prior Publication Data

US 2019/0134788 A1 May 9, 2019

(51) Int. Cl.
| | |
|---|---|
| *B25B 13/46* | (2006.01) |
| *B25B 23/10* | (2006.01) |
| *B25B 13/48* | (2006.01) |

(52) U.S. Cl.
CPC .......... *B25B 13/463* (2013.01); *B25B 23/103* (2013.01); *B25B 13/48* (2013.01)

(58) Field of Classification Search
CPC ..... B25B 13/463; B25B 23/103; B25B 27/18; B25B 7/143; B25B 13/5075; B25B 13/48; B25B 23/0035; B25B 13/46; F16D 41/08; F16D 41/16; F16D 41/18; F16D 41/185; F16H 31/002; F16H 31/005
USPC .................................................. 81/63.2, 60
See application file for complete search history.

(56) References Cited

U.S. PATENT DOCUMENTS

| | | | | |
|---|---|---|---|---|
| 7,146,882 B1* | 12/2006 | Chang | ................... | B25B 13/463 81/63.2 |
| 8,042,433 B2* | 10/2011 | Chu | ..................... | B25B 13/463 81/60 |
| 8,943,929 B2* | 2/2015 | Ou | ......................... | B25B 13/463 81/60 |
| 9,205,538 B2* | 12/2015 | Yang | ...................... | B25B 13/463 |
| 9,931,737 B2* | 4/2018 | Kao | ....................... | B25B 13/463 |
| 2004/0134313 A1* | 7/2004 | Liu | ........................ | B25B 13/463 81/63.2 |
| 2007/0277653 A1* | 12/2007 | Lin | ....................... | B25B 13/463 81/63.2 |
| 2011/0107879 A1* | 5/2011 | Hu | ........................ | B25B 13/463 81/63 |
| 2014/0047955 A1* | 2/2014 | Ou | ......................... | B25B 13/463 81/60 |
| 2016/0008959 A1* | 1/2016 | Hu | ........................ | B25B 13/463 81/63.2 |
| 2018/0272504 A1* | 9/2018 | Yang | ...................... | B25B 13/463 |
| 2019/0344406 A1* | 11/2019 | Chen | .................... | B25B 23/0057 |
| 2020/0016727 A1* | 1/2020 | Bingham | .............. | B25B 13/463 |

* cited by examiner

*Primary Examiner* — Monica S Carter
*Assistant Examiner* — Mahdi H Nejad

(57) ABSTRACT

A ratchet wrench includes a handle and a head. A ratchet wheel is received in the through hole and a pawl located in a curved recess in the head is engaged with the ratchet wheel. A slot is defined through the top and bottom of the handle and a portion of the head. A control member is slidably engaged with the slot and controls the pawl. The control member includes a tongue which is engaged with a top groove of the ratchet wheel. When sliding the control member away from the ratchet wheel, the tongue is disengaged from the top groove and the pawl is shifted by the control member, so that the ratchet wheel is able to be picked out from the through hole.

12 Claims, 9 Drawing Sheets

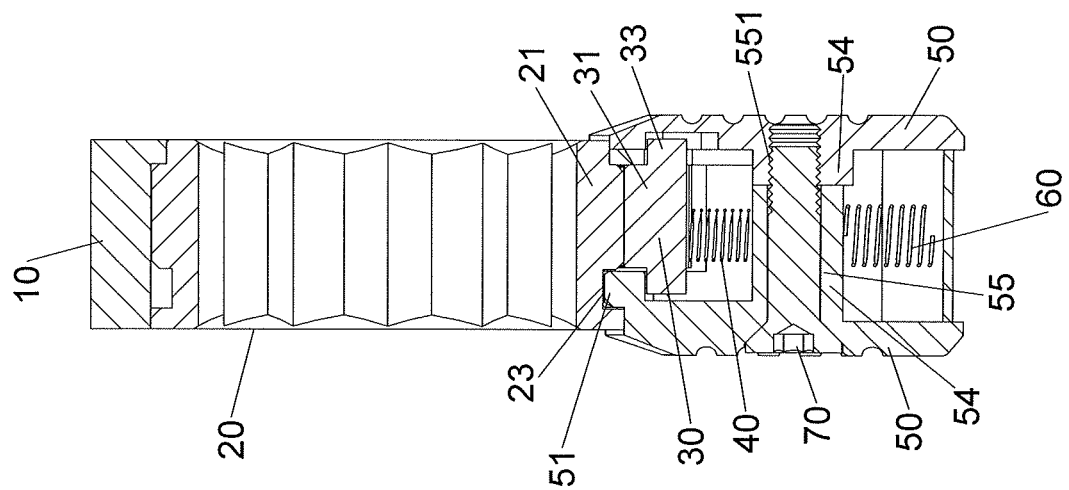
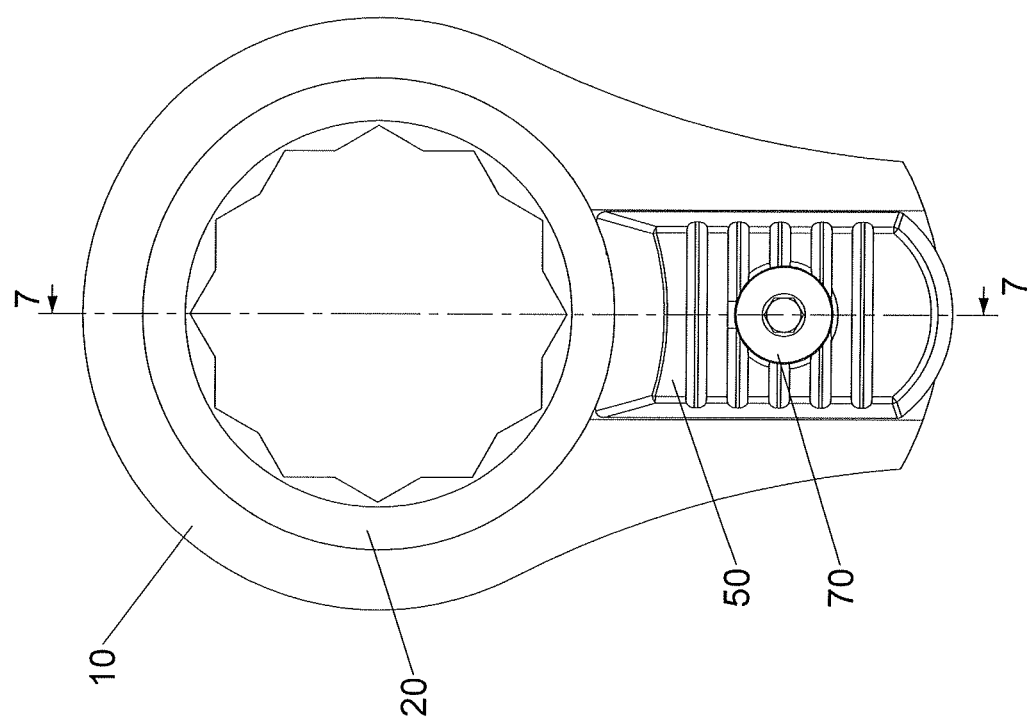

RATCHET WRENCH

BACKGROUND OF THE INVENTION

1. Fields of the Invention

The present invention relates to a ratchet wrench, and more particularly, to a ratchet wrench with simple structure and better strength.

2. Descriptions of Related Art

The conventional ratchet wrench is disclosed in U.S. Pat. No. 8,042,433, and comprises a handle having at least one end forming a head portion. The head portion forms a hollow collar chamber having a bottom forming a support flange. The collar chamber has a circumferential wall forming a switching channel. The switching channel has an inner wall defining a receiving slot. The head portion has a top surface to which a lid plate is fixed. The lid plate has an edge forming a one-side open operation cutoff. The cutoff has an opposite wall forming a release notch. A driving collar is received in the collar chamber and is positioned on the support flange. The driving collar has an outer circumferential surface forming a plurality of ratcheting teeth. The driving collar forms a circumferential positioning groove in the outer circumferential surface at a location close to the top thereof. A pawl member is received in the switching channel and forms a plurality of ratcheting teeth for engaging with the driving collar. The pawl member forms a positioning peg corresponding to the circumferential positioning groove in the middle portion close to the top thereof. The top of the pawl member is coupled through a linking bar to a pusher pad that is positioned on and movable along the top surface of the lid plate. A retention block is received in the receiving slot. The retention block forms a bore that comprises a rear section forming an inner shoulder. The bore movably receives therein a push bar having a step section. A resilient biasing element is arranged between the push bar and an inside wall.

However, the wrench includes multiple parts but requires long assembly time and higher manufacturing cost. The ratcheting teeth has a hole defined therethrough for receiving the linking bar, therefore, the strength of the ratcheting teeth becomes weak due to the hole. Besides, the pusher rod and the linking bar are connected by glue which may fail for period of time. If the two parts are connected by a bolt, a threaded hole has to be drilled through them, the cost will increase. When the ratcheting teeth move backward, the pusher rod moves with the movement of the ratcheting teeth. The pushing rod frequently moves and shakes, this will affect the connection and stability. When the driving collar is picked out, the resilient biasing element behind the ratcheting teeth will push the ratcheting teeth, the pusher rod and the push bar will be pushed out from the collar chamber, and are separated from each other. The users are difficult to re-assemble them back to the head portion of the wrench.

The present invention intends to provide a ratchet wrench with simple structure and better strength.

SUMMARY OF THE INVENTION

The present invention relates to a A ratchet wrench includes a handle and a head. A ratchet wheel is received in the through hole and a pawl located in a curved recess in the head is engaged with the ratchet wheel. A slot is defined through the top and bottom of the handle and a portion of the head. A control member is slidably engaged with the slot and controls the pawl. The control member includes a tongue which is engaged with a top groove of the ratchet wheel. When sliding the control member away from the ratchet wheel, the tongue is disengaged from the top groove and the pawl is shifted by the control member, so that the ratchet wheel is able to be picked out from the through hole.

The pawl of the present invention does not need to be drilled a hole.

The control member includes a top control member and a bottom control member, wherein the bottom control member has a restriction hole which restricts the protrusion on the bottom of the pawl so that the pawl is controlled by the movement of the control member.

The control member includes a tongue which is engaged with a top groove of the ratchet wheel so that the ratchet wheel is restricted in the through hole.

When the control member is slid away from the ratchet wheel, the ratchet wheel can be easily picked out from the through hole.

The present invention will become more apparent from the following description when taken in connection with the accompanying drawings which show, for purposes of illustration only, a preferred embodiment in accordance with the present invention.

BRIEF DESCRIPTION OF THE DRAWINGS

FIG. 6 is a top view of the disclosure of FIG. 5;

FIG. 7 is a cross sectional view, taken along line 7-7 in FIG. 6;

DETAILED DESCRIPTION OF THE PREFERRED EMBODIMENT

Figure 1:
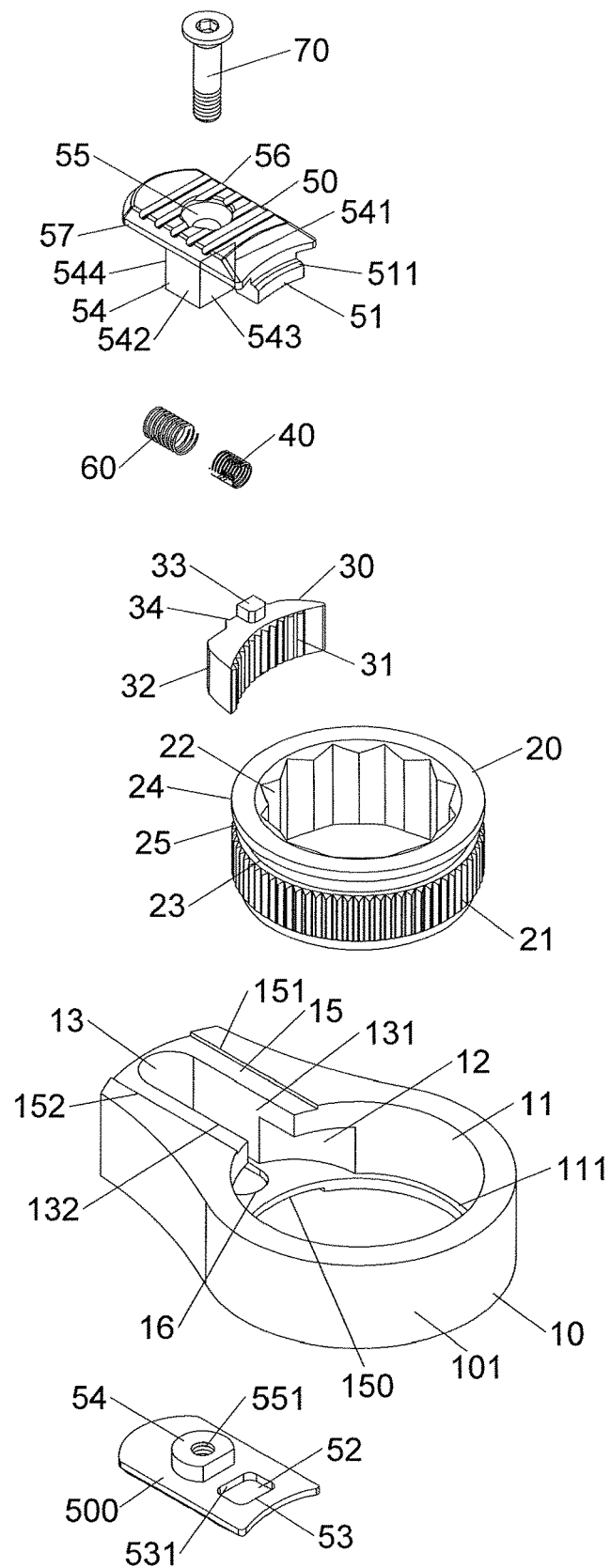
FIG. 1 is an exploded view of the ratchet wrench of the present invention.
Figure 3:
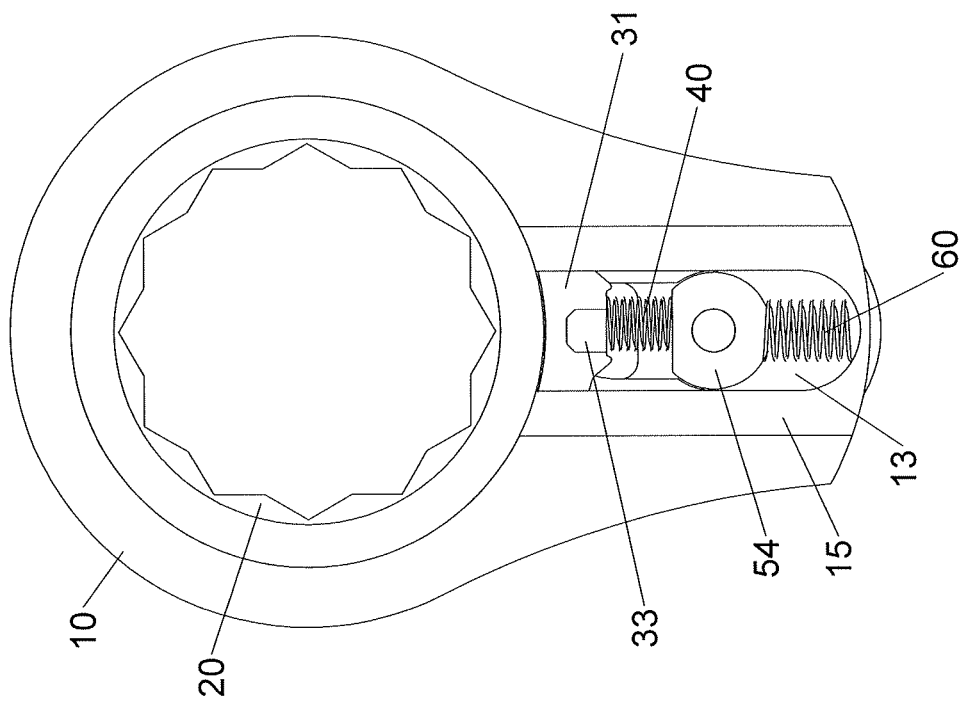
FIG. 3 is a top view to how the parts located inside the slot.
Figure 2:
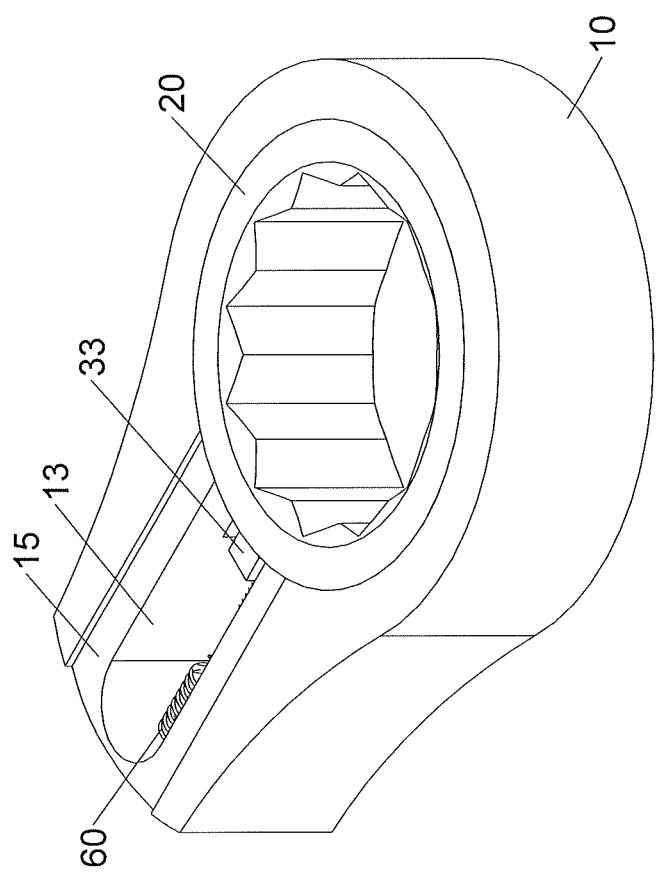
FIG. 2 is a perspective view to show the head and a portion of the handle of the ratchet wrench of the present invention.
Figure 4:
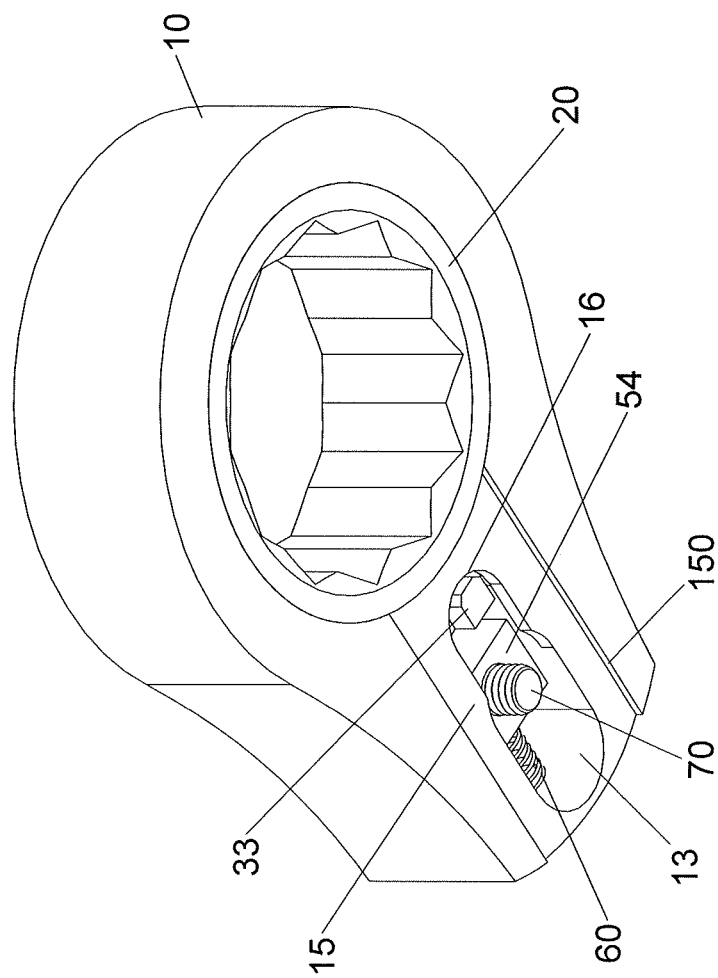
FIG. 4 is another angle of view of the head and a portion of the handle of the ratchet wrench of the present invention.
Figure 5:
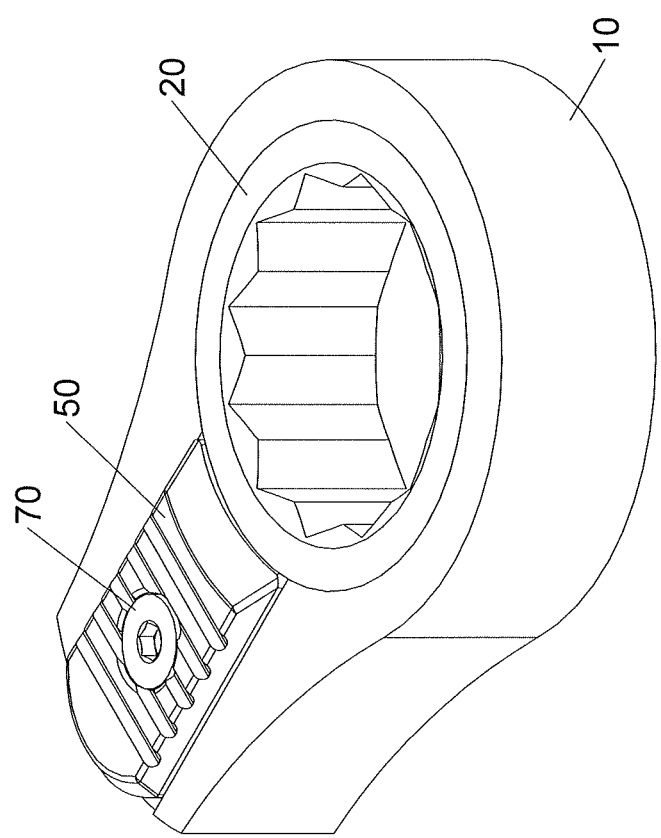
FIG. 5 is a perspective view to show that the top control member is connected to the slot of the ratchet wrench of the present invention.

Referring to FIGS. 1 to 5, the ratchet wrench 10 of the present invention comprises a handle 100 and a head 101 formed one end of the handle 100. The head 101 has a through hole 11 defined through the top and the bottom thereof. A first surface 111 extends inward from the inner periphery of the through hole 11. A curved recess 12 is defined in inner periphery of the through hole 11 and includes a closed top and a closed bottom. The center of the curved recess 12 is located within the through hole 11. A slot 13 is defined through the top and the bottom of the ratchet wrench 10 and communicates with the curved recess 12. The slot 13 includes a first sidewall 131 and a second sidewall 132 which is parallel with the first sidewall 131. A top recessed area 15 is defined in the top of the handle 100 and a portion of the head 101. A bottom recessed area 150 is defined in the underside of the handle 100 and a portion of the head 101. The front end of each of the top recessed area 15 and the bottom recessed area 150 communicates with the through hole 11, but does not communicate with the curved recess 12, wherein the front end of each of the front and bottom recessed areas 15, 150 is located close to the through hole 11. The top recessed area 15 has a third sidewall 151 and a fourth sidewall 152 which is parallel with the third sidewall 151. The slot 13 defined through a portion of the closed bottom of the curved recess 12 and forms a first contact inner end 16 formed at the front end of the slot 13. The front end of the slot 13 is located close to the curved recess 12. It is noted that the front end of the slot 13 communicates with the curved recess 12, and the front end of the slot in the bottom of the handle 100 does not communicate with the through hole 11 because of the first contact inner end 16. The first contact inner end 16 is a curved end or a flat end.

A ratchet wheel 20 is rotatably received in the through hole 11 and has a first toothed portion 21 defined in the outer periphery thereof. A top groove 23 is defined between the flange extending from the upper portion of the outer periphery 24 of the ratchet wheel 20 and the first toothed portion 21. The bottom of the ratchet wheel 20 is rested on the first surface 111. A second surface 25 is formed on the underside of the flange of the upper portion of the outer periphery of the ratchet wheel 20. The ratchet wheel 20 includes a polygonal mounting hole 22 defined therein so that an object such as a nut or bolt head can be engaged with the polygonal mounting hole 22.

A pawl 30 is movably received in the curved recess 12 and has a second toothed portion 31 formed on the front side thereof. The second toothed portion 31 is engaged with the first toothed portion 21. The pawl 30 has a curved rear side 32 which contacts the inner wall of the curved recess 12. An engaging portion 34 extends from the curved rear side 32 of the pawl 30. The pawl 30 has a protrusion 33 extending from each of the top and the bottom thereof. The protrusions 33 each are a non-circular protrusion or a circular protrusion. The protrusion 33 on the bottom of the pawl 30 is restricted by the first contact inner end 16 so that the pawl 30 does not drop out from the curved recess 12. A front spring 40 is located in the slot 13 and biases the engaging portion 34 of the pawl 30 to engage the second toothed portion 31 with the first toothed portion 21.

A top control member 50 and a bottom control member 500 are respectively and movably engaged with the slot 13 on the top and on the bottom of the ratchet wrench 10 so as to operate the front spring 40 in the slot 13. Specifically, the top control member 50 and the bottom control member 500 respectively slide in the top and bottom recessed areas 15, 150. The top control member 50 has a tongue 51 which has a curved distal end so as to be engaged with the top groove 23. The tongue 51 includes a third surface 511 extending from the top thereof and contacting the second surface 25, such that the ratchet wheel 20 is rotatable in the through hole 11 and does not drop out from the through hole 11. The bottom control member 500 has a rectangular restriction hole 52 in which the protrusion 33 on the bottom of the pawl 30 is movably inserted. When the pawl 30 in the curved recess 12 moves backward relative to the ratchet wheel 20, the protrusion 33 moves in the restriction hole 52, and the tongue 51 is still engaged with the top groove 23, the ratchet wheel 20 does not drop out from the through hole 11. The restriction hole 52 has a second restriction portion 53 on one of the insides thereof, the second restriction portion 53 located close to the through hole 11. When the top control member 50 moves in the top recessed area 15 and drives the bottom control member 500 away from the ratchet wheel 20, the second restriction portion 53 moves the protrusion 33 and the pawl 30 to move so as to disengage the second toothed portion 31 from the first toothed portion 21, and to disengage the tongue 51 from the top groove 23, such that the ratchet wheel 20 is able to be picked out from the through hole 11. When the ratchet wheel 20 is picked out from the through hole 11, the protrusion 33 on the bottom of the pawl 30 is restricted by the first contact inner end 16 so that the pawl 30 is not able to be picked from the curved recess 12. The restriction hole 52 has a third restriction portion 531 on another inside thereof, wherein the third restriction portion 531 located away from the through hole 11. When the protrusion 33 on the bottom of the pawl 30 is restricted by the third restriction portion 531, top control member 50 is restricted by the pawl 30 and is not able to be picked from the top recessed area 15. The top control member 50 and the bottom control member 500 each have a tubular portion 54 which is inserted into the slot 13. The tubular portion 54 of the top control member 50 has two sides 541, 542 respectively contacting the first sidewall 131 and the second sidewall 132. The front spring 40 is biased between the engaging portion 34 of the pawl 30 and the front side 543 of the tubular portion 54 of the top control member 50. The tubular portion 54 of the top control member 50 includes a passage 55. The tubular portion 54 of the bottom control member 500 includes a threaded hole 551. A bolt 70 extends through the passage 55 and is threadedly connected to the threaded hole 551. The top control member 50 has two lateral sides 56, 57 respectively contacting the third sidewall 151 and the fourth sidewall 152. Two lateral sides of the bottom control member 500 respectively contact the two sidewalls of the bottom recessed area 150. A rear spring 60 is located in the slot 13 and between the top and bottom control members 50, 500. The rear spring 60 is biased between the rear side of the tubular portion 54 of the top control member 50 and the inner/rear end of the slot 13. Therefore, the top and bottom control members 50, 500 move back to their initial position by the rear spring 60. The resilient force of the rear spring 60 is larger than that of the front spring 40.

As shown in FIGS. 6 and 7, the tongue 51 is engaged with the top groove 23 so that the ratchet wheel 20 is rotatable in the through hole 11 and does not drop out from the through hole 11. The restriction hole 52 restricts the protrusion 33.

Figure 9:
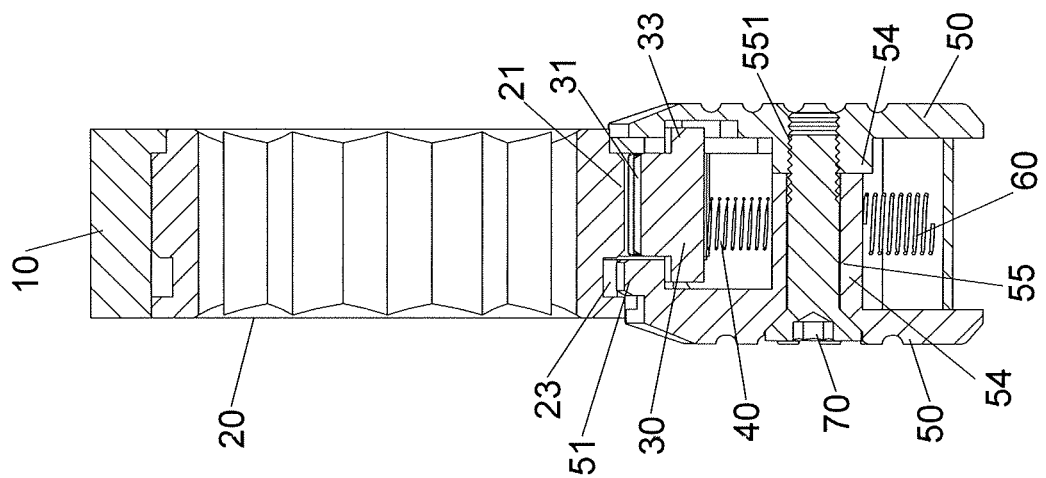
FIG. 9 is a cross sectional view, taken along line 9-9 in FIG. 8.
Figure 8:
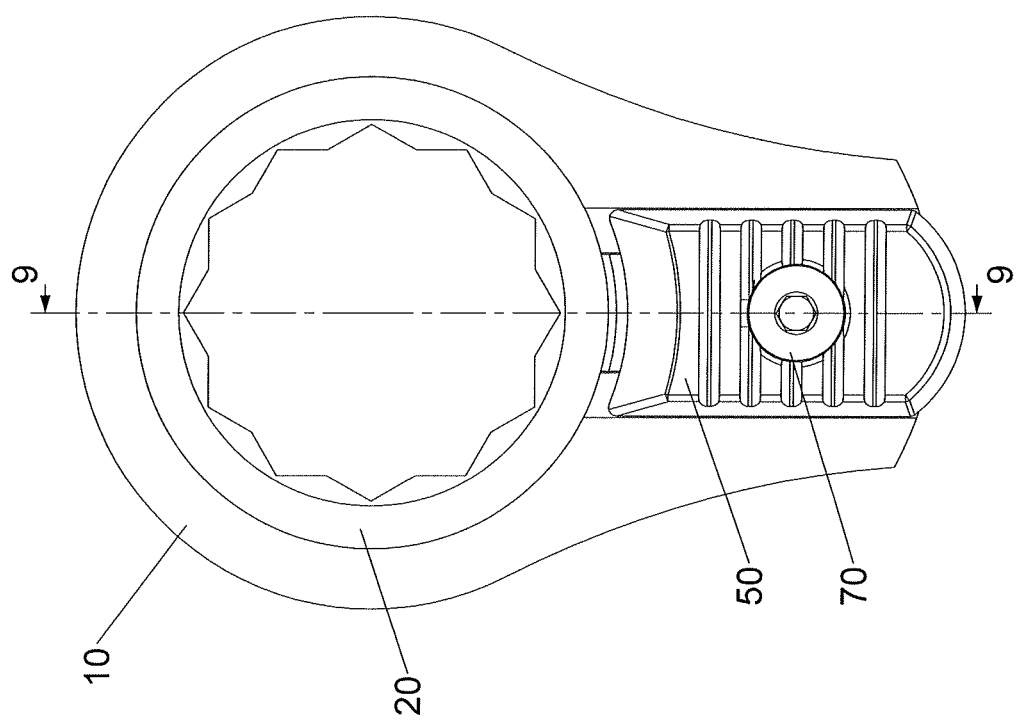
FIG. 8 is a top view to show that the control member is slid backward.
Figure 10:
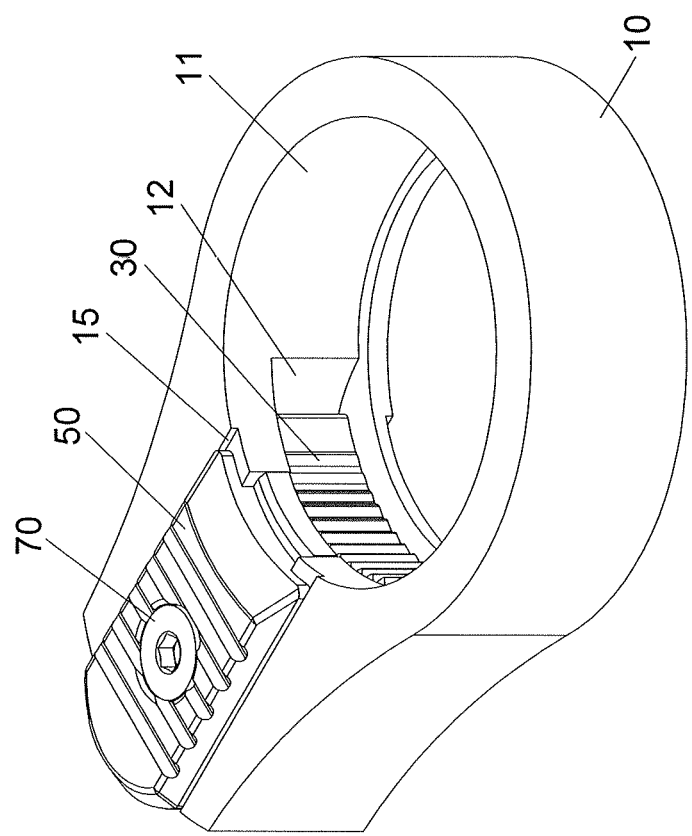
FIG. 10 is a perspective view to show that the ratchet wheel is picked out from the through hole of the head of the present invention.

As shown in FIGS. 8 to 10, the top control member 50 is movable in the top recessed area 15, and the restriction hole 52 restricts the protrusion 33, so that when the top control member 50 moves backward in the top recessed area 15 and drives the bottom control member 500 away from the ratchet wheel 20, the pawl 30 compresses the front spring 40, and the second toothed portion 31 is disengaged from the first toothed portion 21, and the tongue 51 is separated from the top groove 23, such that the ratchet wheel 20 is able to be picked out from the through hole 11 and a new ratchet wheel 20 can be replace.

Figure 11:
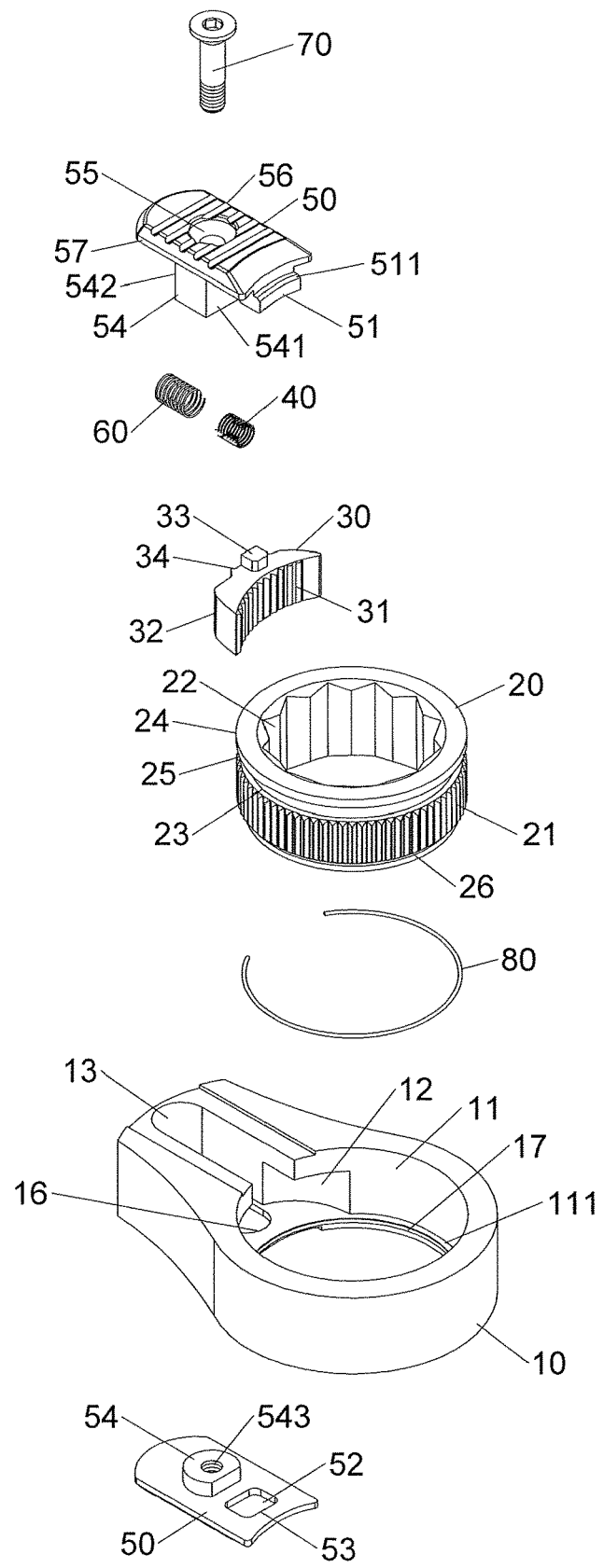
FIG. 11 is an exploded view of the second embodiment of the ratchet wrench of the present invention.

As shown in FIG. 11 which shows the second embodiment of the present invention, the through hole 11 has a first clip recess 17 defined in the inner periphery thereof. The first clip recess 17 is located close to the bottom of the head 101.

The ratchet wheel 20 includes a second clip recess 26 which is located in the lower portion of the ratchet wheel 20. A clip 80 is engaged with the first and second clip recesses 17, 26. When the top control member 50 is shifted backward, the tongue 51 is disengaged from the top groove 23, the clip 80 is disengaged from the second clip recess 26 by pushing the ratchet wheel 20, so that the ratchet wheel 20 is able to be pick out from the through hole 11.

Figure 12:
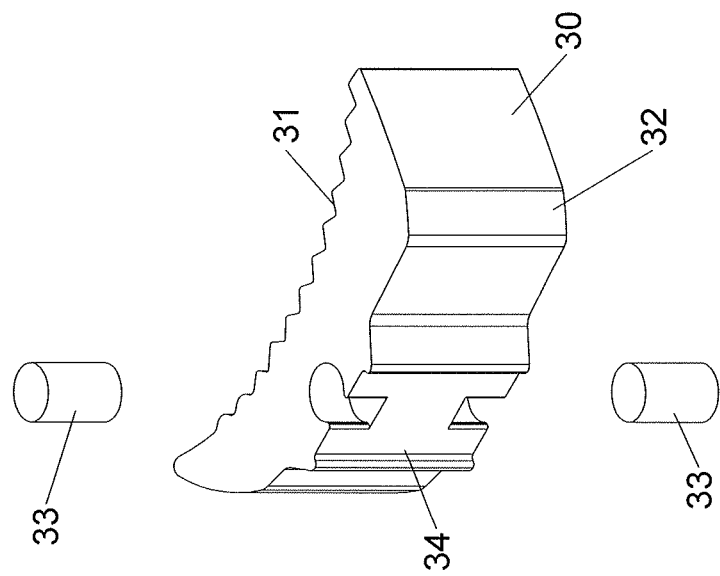
FIG. 12 is an exploded view to show the pawl and the two protrusions of the ratchet wrench of the present invention.

As shown in FIG. 12 which shows the third embodiment of the present invention. The pawl 30 and the two respective protrusions 33 are three individual parts, the pawl 30 including two notches in which the two protrusions 33 are engaged.

In application, there can be multiple ratchet wheels 20 with different sizes of the mounting hole 22. These ratchet wheels 20 can be cooperated with the ratchet wrench 10 so as to tighten or loosen objects such as nuts or bolt heads. Of course, the ratchet wheels 20 can have a rectangular protrusion for being connected with sockets.

The advantages of the present invention are that the pawl 30 does not need to be drilled any hole or recess, so that the pawl 30 has better strength when comparted with those pawls with a hole.

The restriction hole 52 is larger than the protrusion 33 so that that the protrusion 33 can move within the restriction hole 52, and the top and bottom control members 50, 500 do not shift away from the slot 13.

When the pawl 30 in the curved recess 12 moves backward relative to the ratchet wheel 20, and the second toothed portion 31 is separated from the first toothed portion 21, the tongue 51 is disengaged from the top groove 23 so that the ratchet wheel 20 can be easily picked out from the through hole 11.

When the pawl 30 moves backward relative to the ratchet wheel 20, both of the top and bottom control members 50, 500 do not move back. However, when the top and bottom control members 50, 500 moves in the top and bottom recessed areas 15, 150, the pawl 30 moves back in the curved recess 12.

After the ratchet wheel 20 is removed from the through hole 11, the protrusion 33 is restricted by the first contact inner end 16 so that the pawl does not drop out from the curved recess 12. The protrusion 33 contacts the third restriction portion 531 to prevent the top control member 50 from removing from the top recessed area 15.

The two sides 541, 542 of the tubular portion 54 of the top control member 50 contact the first and second sidewalls 131, 132, and the two lateral sides 56, 57 contacts the third and fourth sidewalls 151, 152, such that the top control member 50 moves in the top recessed area 15 more stable.

While we have shown and described the embodiment in accordance with the present invention, it should be clear to those skilled in the art that further embodiments may be made without departing from the scope of the present invention.

What is claimed is:

1. A ratchet wrench comprising:

a handle and a head formed one end of the handle, the head having a through hole defined through a top and a bottom thereof, a first surface extending inward from an inner periphery of the through hole, a curved recess defined in inner periphery of the through hole and having a closed top and a closed bottom, a slot defined through a top and a bottom of the ratchet wrench and communicating with the curved recess, the slot having a first sidewall and a second sidewall which is parallel with the first sidewall, a top recessed area defined in a top of the handle and a portion of the head, the top recessed area communicating with the through hole, the top recessed area having a third sidewall and a fourth sidewall which is parallel with the third sidewall, the slot defined through a portion of the closed bottom of the curved recess and forming a first contact inner end formed at a front end of the slot, the front end of the slot located close to the curved recess;

a ratchet wheel rotatably received in the through hole and having a first toothed portion defined in an outer periphery thereof, a top groove defined between a flange extending from an upper portion of the outer periphery of the ratchet wheel and the first toothed portion, the ratchet wheel rested on the first surface, a second surface formed on an underside of the flange of the upper portion of the outer periphery of the ratchet wheel;

a pawl movably received in the curved recess and having a second toothed portion formed on a front side thereof, the second toothed portion engaged with the first toothed portion, the pawl having a curved rear side which contacts the inner wall of the curved recess, an engaging portion extending from the curved rear side of the pawl, the pawl having a protrusion extending from each of a top and a bottom thereof, the protrusion on the bottom of the pawl being restricted by the first contact inner end so that the pawl does not drop out from the curved recess;

a front spring located in the slot and biasing the pawl to engage the second toothed portion with the first toothed portion;

a top control member and a bottom control member respectively and movably engaged with the slot on the top and on the bottom of the ratchet wrench so as to operate the front spring in the slot, the top control member having a tongue which is located in the top groove, the bottom control member having a restriction hole in which the protrusion on the bottom of the pawl is movably inserted, the restriction hole having a second restriction portion on one of the insides thereof, the second restriction portion located close to the through hole, when the top control member moves in the top recessed area and drives the bottom control member away from the ratchet wheel, the second restriction portion moves the protrusion and the pawl to move so as to disengage the second toothed portion from the first toothed portion and to disengage the tongue from the top groove such that the ratchet wheel is able to be picked out from the through hole, when the ratchet wheel is picked out from the through hole, the protrusion on the bottom of the pawl is restricted by the first contact inner end so that the pawl is not able to be picked from the curved recess, the restriction hole having a third restriction portion on another inside thereof, the third restriction portion located away from the through hole, when the protrusion on the bottom of the pawl is restricted by the third restriction portion, the top control member is restricted by the pawl and is not able to be picked from the top recessed area, the top control member and the bottom control member each having a tubular portion which is inserted into the slot, the tubular portion of the top control member having two sides respectively contacting the first sidewall and the second sidewall, the front spring biased between the pawl and the tubular portion of the top control member, the top control member having two lateral sides respectively contacting the third sidewall and the fourth sidewall, and a rear spring located in the slot and biased between the tubular portion of the top control member and an inner end of the slot.

2. The ratchet wrench as claimed in claim 1, wherein the ratchet wheel includes a polygonal mounting hole defined therein.

3. The ratchet wrench as claimed in claim 1, wherein the first contact inner end is a curved end or a flat end.

4. The ratchet wrench as claimed in claim 1, wherein the protrusions each are a non-circular protrusion or a circular protrusion, the restriction hole is a rectangular hole, the second and third restriction portions are located corresponding to each other.

5. The ratchet wrench as claimed in claim 1, wherein the tongue has a curved distal end.

6. The ratchet wrench as claimed in claim 1, wherein the tubular portion of the top control member includes a passage, the tubular portion of the bottom control member includes a threaded hole, a bolt extends through the passage and is threadedly connected to the threaded hole.

7. The ratchet wrench as claimed in claim 1, wherein a resilient force of the rear spring is larger than that of the front spring.

8. The ratchet wrench as claimed in claim 1, wherein the through hole has a first clip recess defined in the inner periphery thereof, the first clip recess is located close to the bottom of the head, the ratchet wheel includes a second clip recess which is located in a lower portion of the ratchet wheel, a clip is engaged with the first and second clip recesses, when the tongue is disengaged from the top groove, the clip is disengaged from the second clip recess by pushing the ratchet wheel, so that the ratchet wheel is able to be pick out from the through hole.

9. The ratchet wrench as claimed in claim 1, wherein the pawl and the two respective protrusions are three individual parts, the pawl including two notches in which the two protrusions are engaged.

10. The ratchet wrench as claimed in claim 1, wherein a front end of the top recessed area communicates with the through hole, the front end of the top recessed area is located close to the through hole.

11. The ratchet wrench as claimed in claim 1, wherein a bottom recessed area is defined in an underside of the handle and a portion of the head, two lateral sides of the bottom control member respectively contact the two sidewalls of the bottom recessed area.

12. The ratchet wrench as claimed in claim 11, wherein a front end of the bottom recessed area communicates with the through hole, the front end of the bottom recessed area is located close to the through hole.

\* \* \* \* \*